US011983437B2

(12) United States Patent
Guim Bernat et al.

(10) Patent No.: US 11,983,437 B2
(45) Date of Patent: May 14, 2024

(54) SYSTEM, APPARATUS AND METHOD FOR PERSISTENTLY HANDLING MEMORY REQUESTS IN A SYSTEM

(71) Applicant: Intel Corporation, Santa Clara, CA (US)

(72) Inventors: Francesc Guim Bernat, Barcelona (ES); Karthik Kumar, Chandler, AZ (US); Donald Faw, Hillsboro, OR (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 16/882,833

(22) Filed: May 26, 2020

(65) Prior Publication Data

US 2020/0285420 A1 Sep. 10, 2020

(51) Int. Cl.
*G06F 3/06* (2006.01)
*G06F 1/30* (2006.01)
*G06F 13/40* (2006.01)

(52) U.S. Cl.
CPC .............. *G06F 3/0659* (2013.01); *G06F 1/30* (2013.01); *G06F 3/0604* (2013.01); *G06F 3/0679* (2013.01); *G06F 13/4022* (2013.01)

(58) Field of Classification Search
CPC ........ G06F 3/0659; G06F 1/30; G06F 3/0604; G06F 3/0679; G06F 13/4022; G06F 2211/1071
See application file for complete search history.

(56) References Cited

U.S. PATENT DOCUMENTS

| 5,452,430 A * | 9/1995 | Dievendorff ........ G06F 11/1441 711/170 |
| 9,495,229 B2 * | 11/2016 | Todd ..................... G06F 11/008 |
| 9,535,828 B1 * | 1/2017 | McKelvie ................. G06F 1/30 |
| 10,521,305 B2 * | 12/2019 | Delaney .............. G06F 11/3034 |
| 11,436,087 B2 * | 9/2022 | Bishnoi ................. G06F 3/0619 |
| 2022/0404979 A1 * | 12/2022 | Wu ........................ G06F 3/0659 |

OTHER PUBLICATIONS

Intel Corporation, "Technology Brief: Data Center Memory and Storage Hierarchy, Intel Optane Technology," Date Unknown, 2 pages total.
U.S. Appl. No. 16/575,478, filed Sep. 19, 2019, entitled "System, Apparatus and Method for Processing Remote Direct Memory Access Operations With a Device-Attached Memory," by Ishwar Agarwal, et al.
U.S. Appl. No. 16/555,372, filed Aug. 29, 2019, entitled "System, Apparatus and Method for Providing A Symmetric Multi-Processor High-Speed Link," by Brian Aspnes, et al.

* cited by examiner

*Primary Examiner* — Idriss N Alrobaye
*Assistant Examiner* — Richard B Franklin
(74) *Attorney, Agent, or Firm* — Trop, Pruner & Hu, P.C.

(57) ABSTRACT

In one embodiment, an apparatus includes: a first queue to store requests that are guaranteed to be delivered to a persistent memory; a second queue to store requests that are not guaranteed to be delivered to the persistent memory; a control circuit to receive the requests and to direct the requests to the first queue or the second queue; and an egress circuit coupled to the first queue to deliver the requests stored in the first queue to the persistent memory even when a power failure occurs. Other embodiments are described and claimed.

20 Claims, 8 Drawing Sheets

SYSTEM, APPARATUS AND METHOD FOR PERSISTENTLY HANDLING MEMORY REQUESTS IN A SYSTEM

TECHNICAL FIELD

Embodiments relate to interacting with a persistent memory.

BACKGROUND

One new memory technology is a persistent memory module that can interact with dynamic random access memory to present a much larger system memory. With a memory subsystem including persistent memory, a merging of disk and memory occurs, where a durable copy of data can be the same as a working copy of the data. While this has benefits, a challenge exists in that coherency issues may result, since a power failure may occur before updated data reaches the persistent memory, particularly in a data center context. This is so, since processor caches and memory controller queues are volatile, and lose data on a power failure. In such scenario, the durable copy of the data in persistent memory may not match a latest value from an application's perspective, resulting in an inconsistency. This problem is particularly exacerbated where processor and persistent memory are located remotely from each other. While some systems provide battery power to accommodate power failures, not all components in a path from processor to persistent memory provide such protection. And managing this inconsistency via software raises complexity and increases latency.

DETAILED DESCRIPTION

In various embodiments, one or more devices on a path between a processor and a persistent memory may be configured to provide power safe domains, such that persistency of data requests, typically write requests to the persistent memory, may be guaranteed to occur and complete, even in the case of a power failure during the handling of the write request from the processor to the persistent memory.

While embodiments are applicable to various devices and interconnects on the path between processor and persistent memory, in one implementation interconnects and a switch coupled to these interconnects may be in accordance with a Compute Express Link (CXL) specification such as the CXL 1.1 Specification or any future versions, modifications variations or alternatives to a CXL specification. Further, while an example embodiment described herein is in connection with CXL-based technology, embodiments may be used in other coherent interconnect technologies such as an IBM XBus protocol, an Nvidia NVLink protocol, an AMD Infinity Fabric protocol, cache coherent interconnect for accelerators (CCIX) protocol or coherent accelerator processor interface (OpenCAPI).

With embodiments a cache coherent persistent memory may be realized, while offering asynchronous DRAM refresh (ADR)-like functionality over a CXL-based network. As a result, remote direct memory access (RDMA) write operations may occur in a manner such that these operations may be guaranteed to successfully complete, even in the case of a power failure during this process. Thus applications may receive feedback from remote switch/link to inform of commitment to a power safe domain, in order to be in a consistent state. One such use case is for databases leveraging RDMA and physical memory, where transactional updates and changes may occur. These update operations may occur without explicit application-managed logging or conventional transmit control protocol-internet protocol (TCP-IP)-based data shipping all the way to remote physical memory and return trip acknowledgements, thus reducing complexity and latency.

In embodiments certain interconnects including CXL links may be provided with multiple virtual channels that are meant to be used to schedule memory requests that have different levels of persistency requirements. In one embodiment, there may be three virtual channels (VCs) provided, each for requests of a given priority. Of course more or fewer VCs may be present in other embodiments. High priority requests may be moved to a persistent domain as soon as possible, while low priority requests can wait to be moved to persistent memory. And mid-level priority requests may fall in between, with behavior controlled based on a given policy implementation. Note that priorities can be different for memory ranges (this also prevents problems or strict protocol ordering). Hence different memory ranges may be mapped to different priorities.

To realize this priority-based handling, a switch in accordance with an embodiment may include elements to implement the priority-based persistency scheme. These elements include, in one embodiment: (1) at least one buffer that stores the amount of requests that can be guaranteed to be flushed to persistent memory in case of power failure; (2) one or more buffers that store pending requests that have not moved yet to the persistent buffer; and (3) a scheduler that arbitrates across the non-guaranteed buffers to the persistent guaranteed buffer and/or to the persistent memory.

Figure 1:
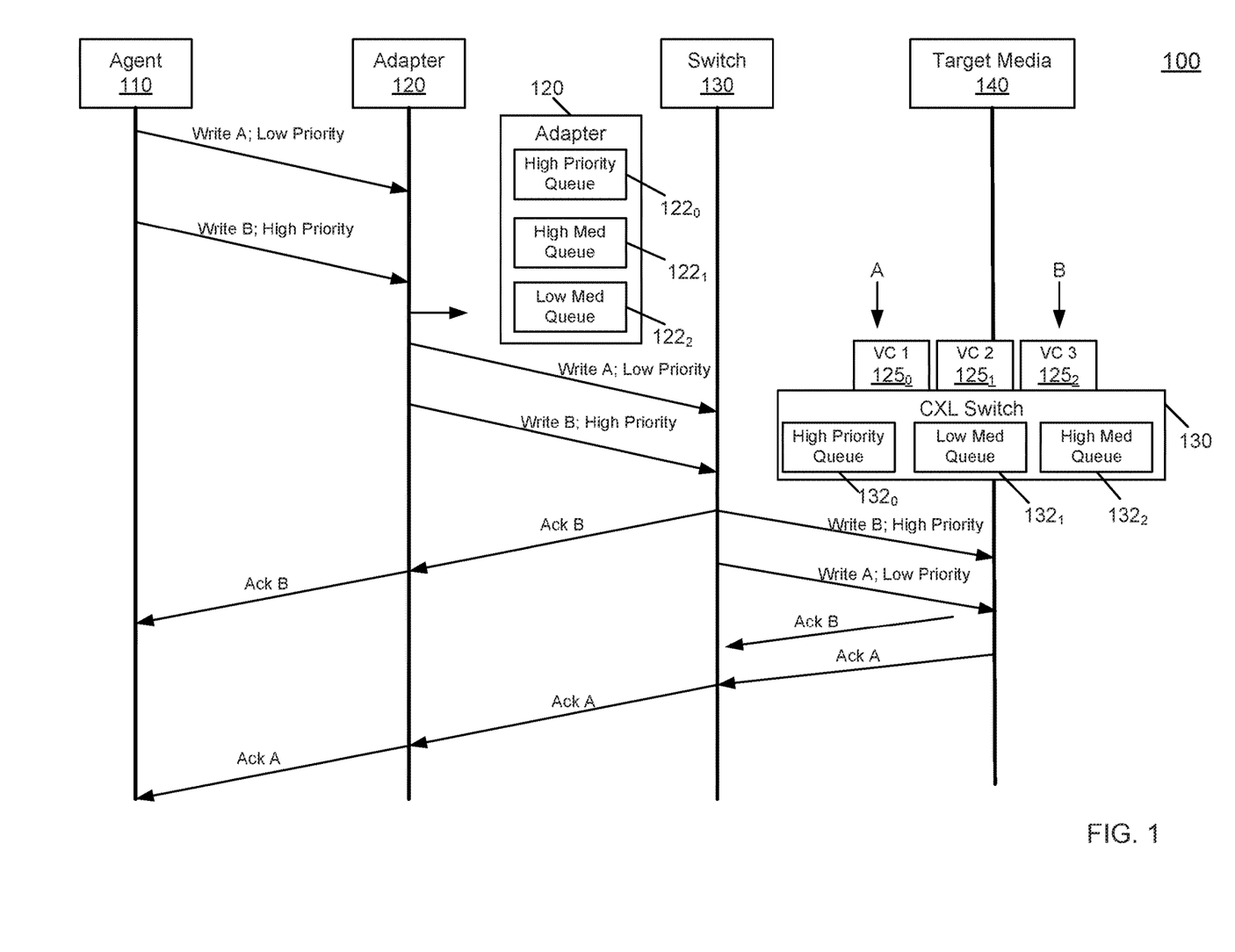
FIG. 1 is a block diagram of a system in accordance with an embodiment.

Referring now to FIG. 1, shown is a block diagram of a system in accordance with an embodiment. As shown, system 100 is a network computing environment in which computing platforms couple via intervening components to a destination storage system such a persistent memory. Specifically, FIG. 1 illustrates a data center environment in which an agent 110 such as a software entity on a given computing platform communicates requests to a target media 140 (namely a persistent memory) via an adapter 120 and switch 130. Adapter 120 may take the form of any type of adapter circuit and may be included in a given platform to act as an interface to other agents, including switch 130. Although embodiments are not limited in this regard, in one implementation adapter 120 may be implemented as a CXL adapter and switch 130 may be implemented as a CXL switch. In some cases, switch 130 may directly couple between multiple platforms, e.g., servers, and a pooled memory formed of a plurality of persistent memories including target media 140.

With embodiments herein, agent 110 may issue memory write requests having a given priority level to target media 140. In one embodiment, this priority level may be based on a service level agreement (SLA) or on another basis. Although this priority may represent a level of priority for the request and its handling, in some cases a separate persistency priority may be provided in the request to indicate a level of priority with regard to a persistency attribute. That is, when a write request is issued from agent 110, it may take some amount of time before data of the request is actually safely stored persistently in target media 140. In this intervening non-persistent period, it is possible that power is lost in one or more of, e.g., adapter 120 and switch 130, such that the request is not completed successfully.

In embodiments, requests issued by agent 110 may be handled in a priority-aware manner with regard to a persistency attribute. To this end, prioritized handling of high priority requests may occur in both of adapter 120 and switch 130 to guarantee completion of certain requests from a persistency point of view.

As illustrated, agent 110 may issue multiple requests, namely write requests to write first data (A, of a first request) and second data (B, of a second request). Note that while the second request for data B is issued subsequently to the first request for data A, this second request has a higher persistency priority than the first request.

As such, when these requests are received in adapter 120 they may be handled differently. For example, each of these requests, which are of different persistency priorities, may be stored in different ones of a plurality of queues $122_{0-n}$, each of which may be associated with a particular priority level. In turn, these requests are sent from adapter 120 to switch 130.

Note in the illustration, it is assumed that there is sufficient bandwidth on an interconnect that couples adapter 120 with switch 130, such that the requests may be sent along in order. In the high level illustrated in FIG. 1, this interconnect may be implemented with different virtual channels. Specifically, the interconnect is shown to include three virtual channels $125_{0-2}$, each of which is associated with a particular priority level, such that the multiple virtual channels can be used to schedule memory requests that have different levels of persistency requirements.

In a CXL implementation, there may be multiple sets of VCs, each associated with a given type of CXL traffic (e.g., CXL.cache, CXL.io and CXL.mem). More generally, embodiments may be used in interconnects such as in FIG. 1, which may be operable to support multiple protocols and communication of data and messages via multiple interconnect protocols, including a CXL protocol as described herein. For example, the interconnect may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In an embodiment, requests belonging to the same virtual channel are maintained in order to keep strict ordering rules of memory protocols. Each virtual channel has a given priority. In case the virtual channels are implemented in the same physical channel, a scheduler on the sender side may provide priority to requests. As an example priority can be defined in percentage of bandwidth utilized for each of the virtual channels.

While FIG. 1 shows operation in which the first request of lower priority is sent via the interconnect to switch 130 ahead of the second request of higher priority, in other cases, particularly where bandwidth may be limited, understand that the higher priority request for data B may be sent ahead of the request for lower priority data A. Thus as shown adapter 120 uses different queues $122_{0-2}$ for the different requests, and sends these different requests via different virtual channels $125_{0-2}$. In the case of high load, requests of high priority persistency queue $122_0$ may use more resources and bandwidth to switch 130 (allocating more resources to the corresponding VC).

As further illustrated in FIG. 1, these requests having different priorities are handled differently within switch 130. Switch 130 may have corresponding queues, namely queues $132_{0-2}$, each of which is associated with a particular priority. With the different handling of requests of different priorities, note that an acknowledgment for the second request for data B may be sent back to agent 110 as soon as the request is received in switch 130 and stored in corresponding high priority buffer $132_0$. Note that while the actual storage of data B has not yet completed, this acknowledgment is an indication of this later completion. This is so, as switch 130 is configured to guarantee that it has sufficient power availability to ensure that all requests stored in high priority queue $132_0$ are guaranteed to be completed to target media 140, even when a power failure occurs within switch 130. And with this early communication of the acknowledgment back to the requester, a reduced latency of operations in the requester is realized. For example, assume a data dependency where a first write request for a first data is to be completed prior to enabling a read request for this first data. By way of the early acknowledgment, the second write request may proceed earlier, reducing latency.

In an embodiment, this guarantee of requests in high priority buffer $132_0$ to be sunk to target media 140 may be based on the amount of ADR power that is dedicated to that queue and current VC high priority utilization to target media 140 (such that in case of power outage on the switch 130, sufficient power is provided to flush the requests on this queue to target media 140). But the same cannot be said for the first request for lower priority data A, since it is possible that on a power failure, this request does not successfully complete to target media 140. However in normal cases these requests will also proceed and be completed at target media 140. As a result, both requests complete within target media 140. Responsive to successful completion, target media 140 may send corresponding acknowledgments back to switch 130. Because switch 130 previously sent an acknowledgment for the second request for data B on its allocation to queue $132_0$, the acknowledgment for this request is simply dropped. Instead, the acknowledgment for the first request is sent back at this later point as shown in FIG. 1.

Switch 130 may include an internal scheduler circuitry, to re-order requests, such that the higher priority second request is issued ahead of the lower priority first request from switch 130 to target media 140. Understand while shown at this high level in the embodiment of FIG. 1, many variations and alternatives are possible. For example, while three queues and VCs are shown, N different VCs can be defined. The acknowledge mechanism may depend on the amount of bandwidth allocated to each VC and the amount of ADR power allocated to each type of persistency priority class. Also, it is possible for the persistency domain to extend further to adapter 120, such that even in the case of a power failure while certain requests are located within adapter 120, these requests may be guaranteed to flow through to target media 140. In such an implementation acknowledgments may be sent directly back to agent 110 when these requests are placed into a persistent domain within adapter 120.

Figure 2:
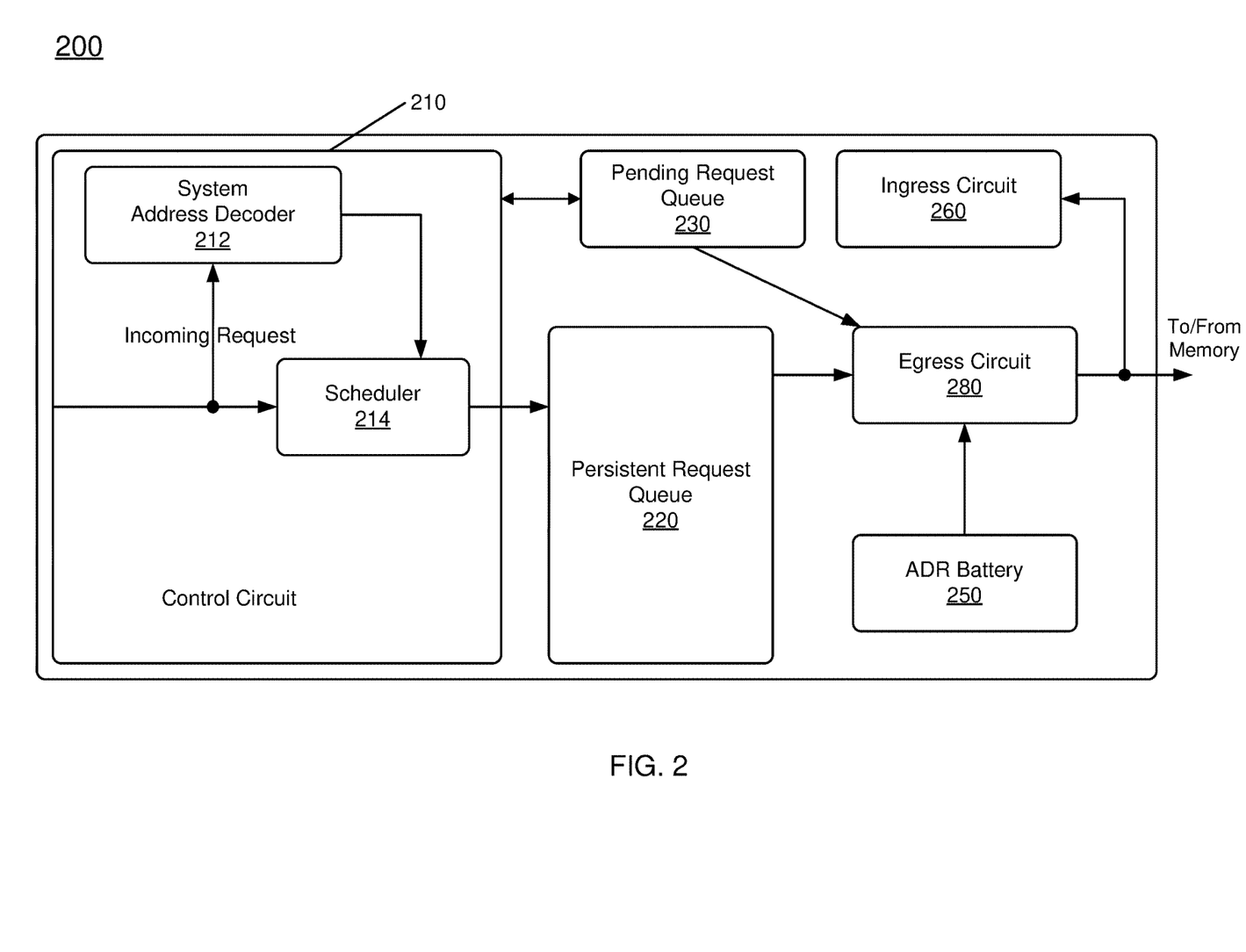
FIG. 2 is a block diagram of a switch in accordance with an embodiment of the present invention.

Referring now to FIG. 2, shown is a block diagram of a switch in accordance with an embodiment of the present invention. As shown in FIG. 2, switch 200 is a hardware circuit that acts as a switching or routing mechanism in different implementations, switch 200 couples entities in a data center or other computing environment. For example, switch 200 may couple between an adapter and a storage system, e.g., implemented as a persistent memory. Of course, switch 200 may couple between many other types of entities.

In any event in the high level shown in FIG. 2, switch 200 is configured to receive incoming requests, e.g., write requests from various upstream agents that are to be directed to a downstream persistent memory. As shown, the incoming requests are provided to control circuit 210. Control circuit 210 may be implemented as a hardware circuit such as a microcontroller, processor core or other controller that executes instructions stored in a non-transitory storage medium. As seen, incoming requests are provided to a scheduler 214 and a system address decoder 212. In embodiments, system address decoder 212 is utilized to validate that the memory requests that are targeting a particular queue (which comes implied by the memory virtual channel) are targeting one of the address spaces registered for that virtual queue. In case that there is a mismatch, an error message is sent back to the sender. In some implementations, this error message may trigger a software interrupt or a machine error.

System address decoder 212 may be configured, when enabled, to confirm that an address of an incoming requests is directed to a permitted address space, e.g., on the basis of requester, request type or so forth. For example, system address decoder 212 may include a mapping to identify a requester's permitted address spaces. Note that priorities can be different for memory ranges (this also prevents problems or strict protocol ordering). Hence different memory ranges are mapped to different priorities. In some implementations 212 may be an optional component.

Scheduler 214 receives incoming requests and may schedule them to either a persistent queue 220 or a pending request queue 230. In embodiments herein, high priority requests may be directed to persistent queue 220. Persistent queue 220 may be configured to have a size such that it is guaranteed that even should a power failure occur, all its stored requests can be written out to the persistent memory. In contrast, pending request queue 230 does not hold such guarantee. As such, on a power failure it is possible and even likely that some or all requests stored in pending request queue 230 do not successfully complete to a persistent memory.

Although in the high level of FIG. 2, single queues 220, 230 are shown, understand that in some implementations there may be separate persistent and pending request queues for each of multiple virtual channels (and possibly for each of different traffic types). Further, understand that there may be different physical queues. Or to implement a more flexible solution, a single buffer can store all the different virtual queues. Note that in this case, different virtual queues may have different capacity allocated. When each of the queues is registered, the definition of the queue comes along with the priority associated with that queue. In one embodiment, this priority may be defined by the percentage of throughput that this queue is allocated with respect to the other queues. In addition, each queue may further be defined with a list of memory ranges that are associated with that queue, to enable checking on the various writes happening to the queue.

To enable the guarantee for requests stored in persistent queue 220, switch 200 includes a battery 250 which may have sufficient charge such that upon a power failure, at least some circuitry of switch 200 present in a persistent power domain remains powered on. To this end, battery 250 may provide power to a persistent power domain including at least an egress circuit 240 and persistent request queue 220, such that upon a power failure egress circuit 240 may cause all requests stored in persistent queue 220 to be sent to the persistent memory.

In normal operation, egress circuit 240 may be configured to submit requests to the persistent memory, which may be implemented as a pooled memory. In addition, egress circuit 240 may be configured to perform arbitration between priority requests and non-priority requests, such that fairness in scheduling is realized. Thus during normal operation both higher priority and lower priority requests may proceed to be sent to the persistent memory. Once the pooled memory acknowledges that a request has been stored into a persistent domain, egress circuit 240 removes the request from the queue and sends an acknowledgement back to the originator of the request (i.e., the specific platform), when the acknowledgement was not previously returned (e.g., in the case of a high priority request). Note that a processor (e.g., a CPU) of the platform then responds to the requester (e.g., a software stack) that the request made persistency.

Finally as shown in FIG. 2, switch 200 may further include an ingress circuit 260 to receive data from persistent memory, e.g., in response to a read request. While shown at this high level in FIG. 2, understand that additional circuitry, including circuitry to ensure that such read requests are sent back to a requester also may be present.

With embodiments, a switch, an adapter and/or other components may be provided with a persistent domain, while providing mechanisms to implement different quality of services policies that allow a solution to be scaled to multiple platforms. Such techniques may be used for resource disaggregation and memory pooling using switches as described herein. In this way, multiple platforms may share queues within the switch, such that policies are implemented holistically at system level.

Figure 3:
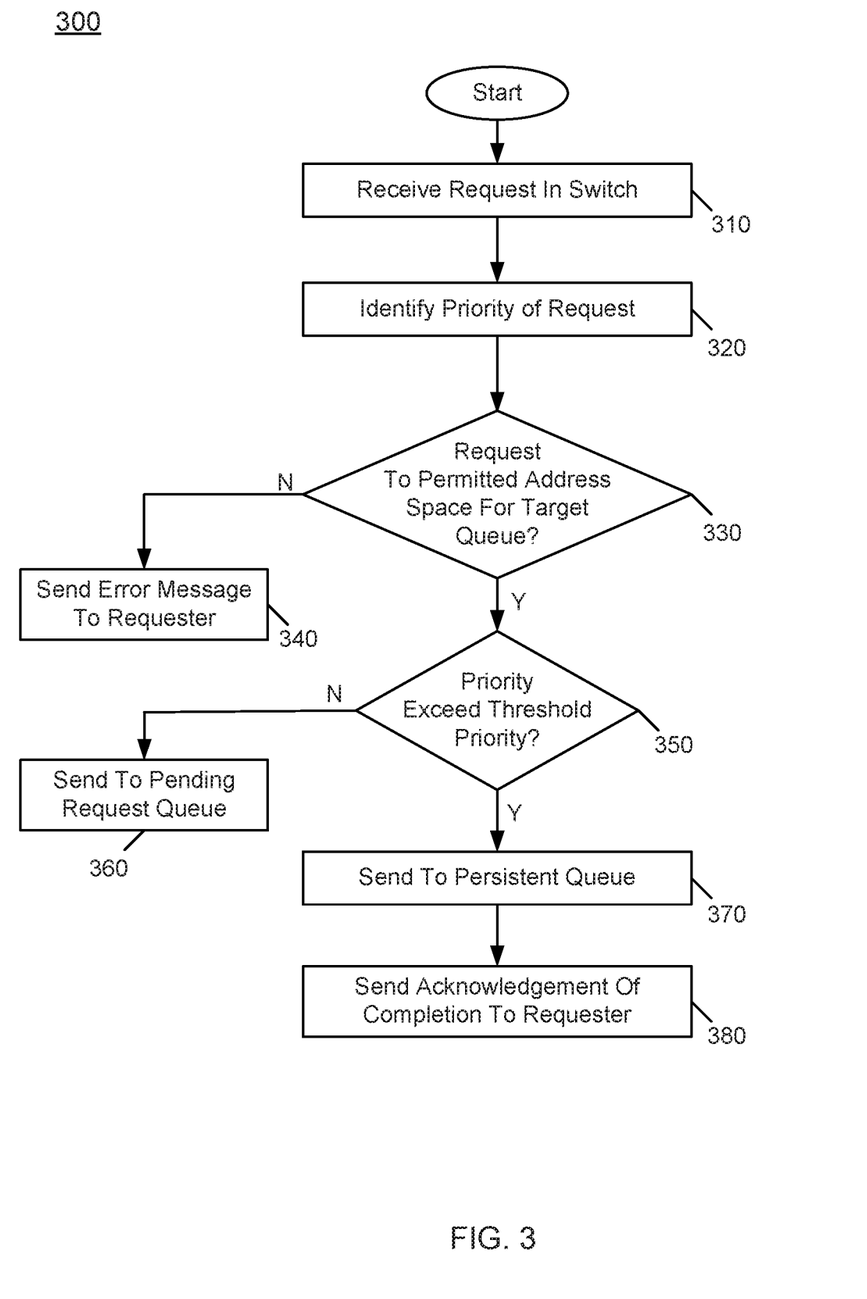
FIG. 3 is a flow diagram of a method in accordance with one embodiment of the present invention.

Referring now to FIG. 3, shown is a flow diagram of a method in accordance with one embodiment of the present invention. As shown in FIG. 3, method 300 is a method for handling incoming requests received in a switch. As such, method 300 may be performed by hardware circuitry, firmware, software and/or combinations thereof.

As illustrated, method 300 begins by receiving a request in the switch (block 310). Assume that this request is a write request to write data to a persistent memory that couples to the switch. Also assume that the incoming write request is of a particular priority level, e.g., according to a SLA with which a requester is associated. In some cases, a further persistent priority level also may be provided to further define persistency priority. Next at block 320, a priority of the request may be identified. For example, a write request may include metadata that includes a priority field to indicate priority level.

Still with reference to FIG. 3 next it may be determined whether the request is directed to a permitted address space for a target queue (diamond 330). For example, a switch may have at least 2 queues, as discussed above. In turn, there may be a mapping to indicate whether a request to a given address space is permitted to target a particular one of these queues (e.g., the persistent queue). If not and the determination at diamond 330 is in the negative, control passes to block 340 where an error message may be sent to the request, and the request may be dropped.

Otherwise if it is determined that the request is for a permitted address space, control passes to diamond 350 to determine whether the priority exceeds a threshold priority. If not, at block 360 the request is sent to a pending request queue of the switch, where it may be stored. Otherwise, the request is sent to a persistent queue of the switch, where it is stored. Finally, at block 380 an acknowledgment of completion of this request may be sent to the requester. That is, even though the data has not been yet written to the persistent memory, by way of the persistency attribute of the switch, it is guaranteed that this request, when written to the persistent queue, will be written to the persistent memory, even if a power failure should occur. Understand while shown at this high level in the embodiment of FIG. 3, many variations and alternatives are possible.

Figure 4:
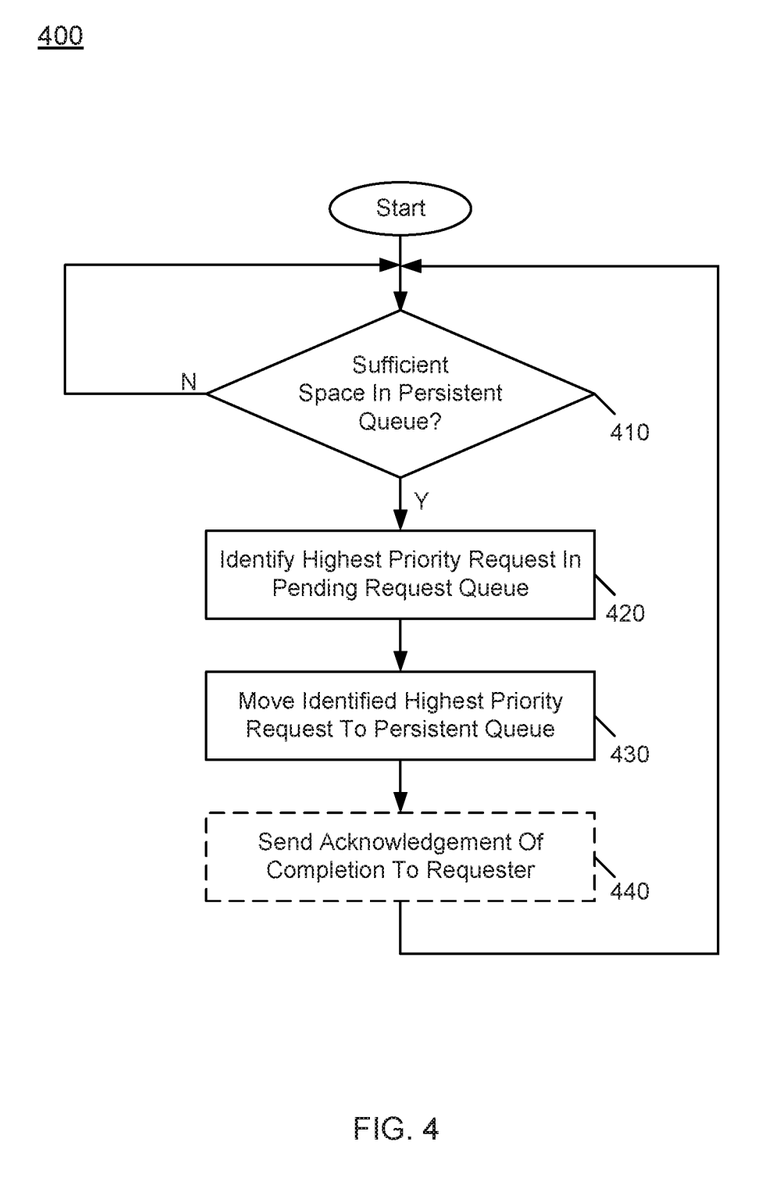
FIG. 4 is a flow diagram of a method in accordance with another embodiment of the present invention.

Referring now to FIG. 4, shown is a flow diagram of a method in accordance with another embodiment of the present invention. As shown in FIG. 4, method 400 is a method for arbitrating access to a persistent queue within a switch, e.g., by a scheduler or other circuitry of the switch. As such, method 400 may be performed by hardware circuitry, firmware, software and/or combinations thereof.

As shown, at diamond 410 it may be determined whether there is sufficient space in the persistent queue. For example, should the occupancy level in the persistent queue fall below a given threshold (e.g., somewhere around 50%), it may be determined that there is sufficient space. If so, control passes to block 420 where a highest priority request in the pending request queue may be identified. When there are multiple such requests of the highest priority level, an oldest request may be identified. Next at block 430 this identified request may be moved to the persistent queue. As such, at this point this request is now guaranteed to be successfully completed, even should a power failure occur. As further shown optionally the switch may send an acknowledgment of a completion for this request back to the requester (block 440). However, in other cases this optional request does not occur at this point and instead an acknowledgment is sent back to the requester only when a corresponding acknowledgment for the actual completion of the write request is received from the persistent memory. Understand while shown at this high level in the embodiment of FIG. 4, many variations and alternatives are possible.

Figure 5:
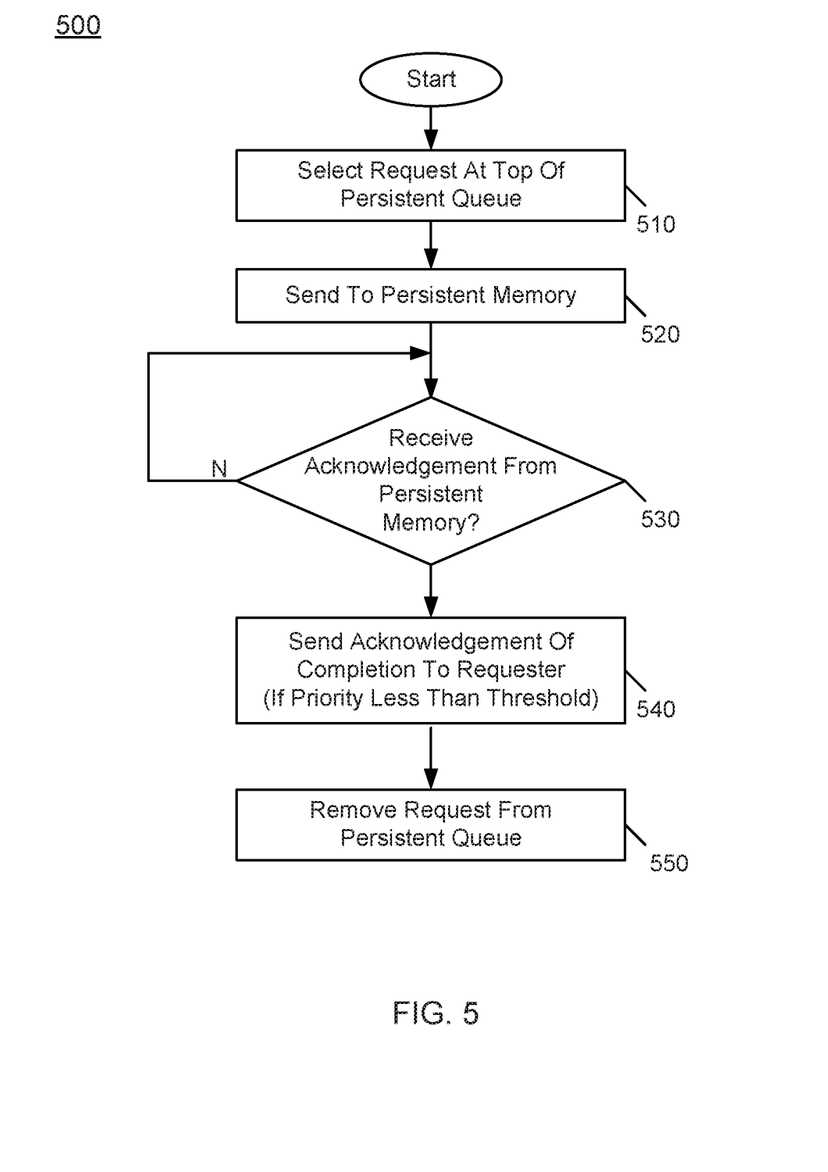
FIG. 5 is a flow diagram of a method in accordance with yet another embodiment of the present invention.

Referring now to FIG. 5, shown is a flow diagram of a method in accordance with yet another embodiment of the present invention. As shown in FIG. 5, method 500 is a method for sending requests from a switch to a target media, as may be performed by an egress circuit of the switch. As such, method 500 may be performed by hardware circuitry, firmware, software and/or combinations thereof. More particularly, method 500 is shown for handling requests from a persistent queue. Understand that similar operations may be performed in handling requests from a non-persistent queue. Still further, understand that the egress circuit may further perform arbitration between requests from at least two different queues. For example, a fairness-based arbitration may be performed, e.g., according to a given credit protocol, such that both higher priority and lower priority requests may be selected and sent to the persistent memory. In addition, when a credit mechanism is present, credit returns may be sent back upstream, e.g., to an adapter. These credit returns in turn allow the adapter to send additional requests of a given type when it has sufficient credits to do so.

As shown in FIG. 5, at block 510 a request at the top of the persistent queue may be selected. Next at block 520, the request is sent to the persistent memory. When it is determined at diamond 530 that an acknowledgment is received from the persistent memory for this request, at block 540 an acknowledgment of the request may be sent to the requester. Note that this acknowledgment is sent only if the priority of the request is below a threshold level. In other words, for a higher priority request that upon receipt within the switch was sent directly to the persistent queue, no acknowledgment needs to be sent back to the requester, as an acknowledgment was previously sent. Thus depending upon the situation, an acknowledgment for this request received from the persistent memory may simply be dropped. Finally, at block 550 the request may be removed from the persistent queue. Understand while shown at this high level in the embodiment of FIG. 5, many variations and alternatives are possible.

Figure 6:
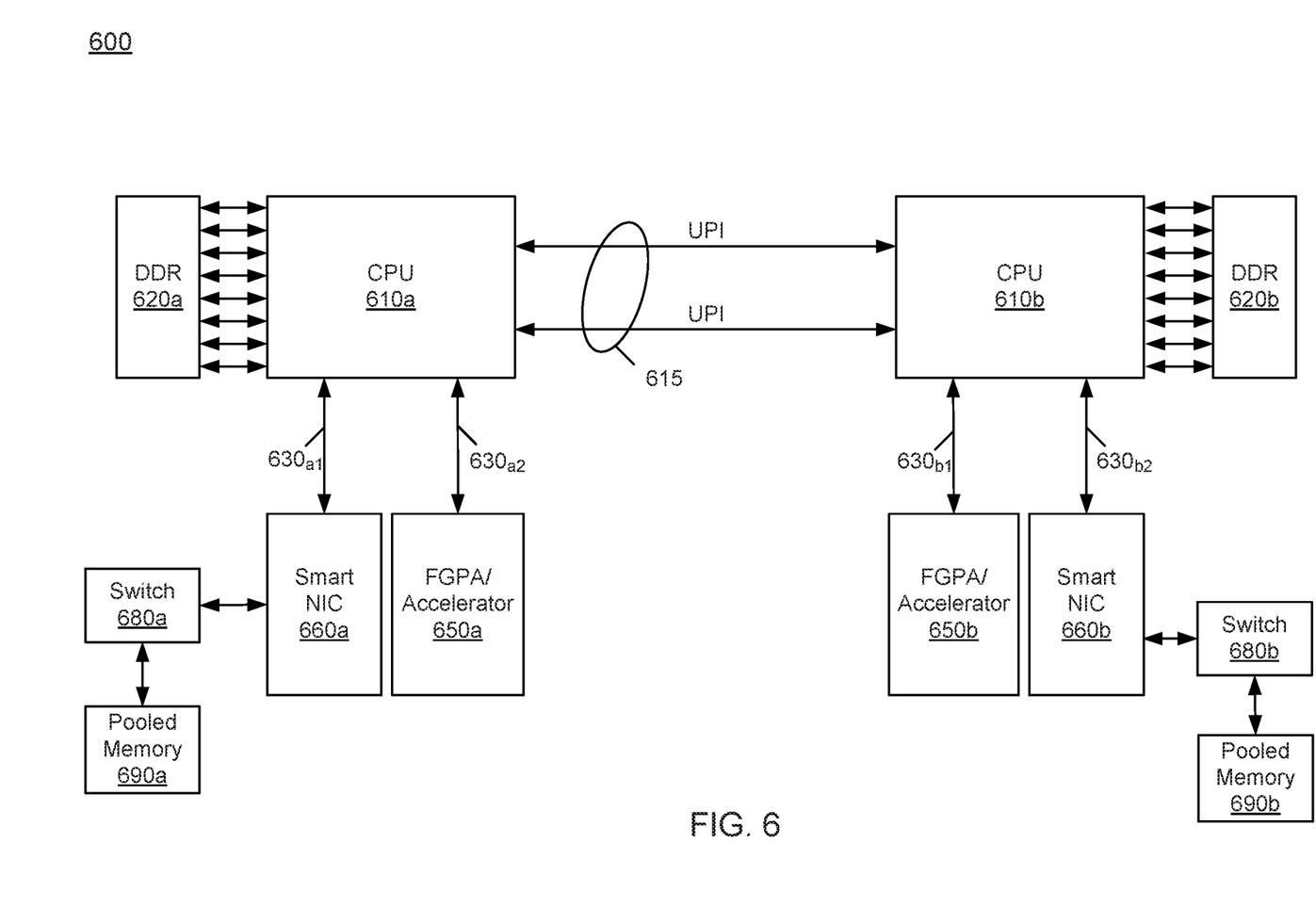
FIG. 6 is a block diagram of a system in accordance with another embodiment of the present invention.

Referring now to FIG. 6, shown is a block diagram of a system in accordance with another embodiment of the present invention. As shown in FIG. 6, a system 600 may be any type of computing device, and in one embodiment may be a server system. In the embodiment of FIG. 6, system 600 includes multiple CPUs 610a,b that in turn couple to respective system memories 620a,b which in embodiments may be implemented as double data rate (DDR) memory. Note that CPUs 610 may couple together via an interconnect system 615 such as an Intel® Ultra Path Interconnect or other processor interconnect technology.

To enable coherent accelerator devices and/or smart adapter devices to couple to CPUs 610 by way of potentially multiple communication protocols, a plurality of interconnects 630a1-b2 may be present. In an embodiment, each interconnect 630 may be a given instance of a CXL bus to enable RDMA communications to occur in an optimized manner as described herein.

In the embodiment shown, respective CPUs 610 couple to corresponding field programmable gate arrays (FPGAs)/ accelerator devices 650a,b (which may include graphics processing units (GPUs), in one embodiment. In addition CPUs 610 also couple to smart NIC devices 660a,b. In turn, smart NIC devices 660a,b couple to switches 680a,b (e.g., CXL switches in accordance with an embodiment) that in turn couple to a pooled memory 690a,b such as a persistent memory. With an arrangement as in FIG. 6, CPUs 610 may issue write requests directed to pooled memory 690. High priority requests, may complete with lower latency by way of routing such requests through persistent domains of, at least, switches 680 (and possibly smart NIC devices 660), such that these the higher priority requests may successfully complete to pooled memory 690, even in the case of power failure in these components.

Figure 7:
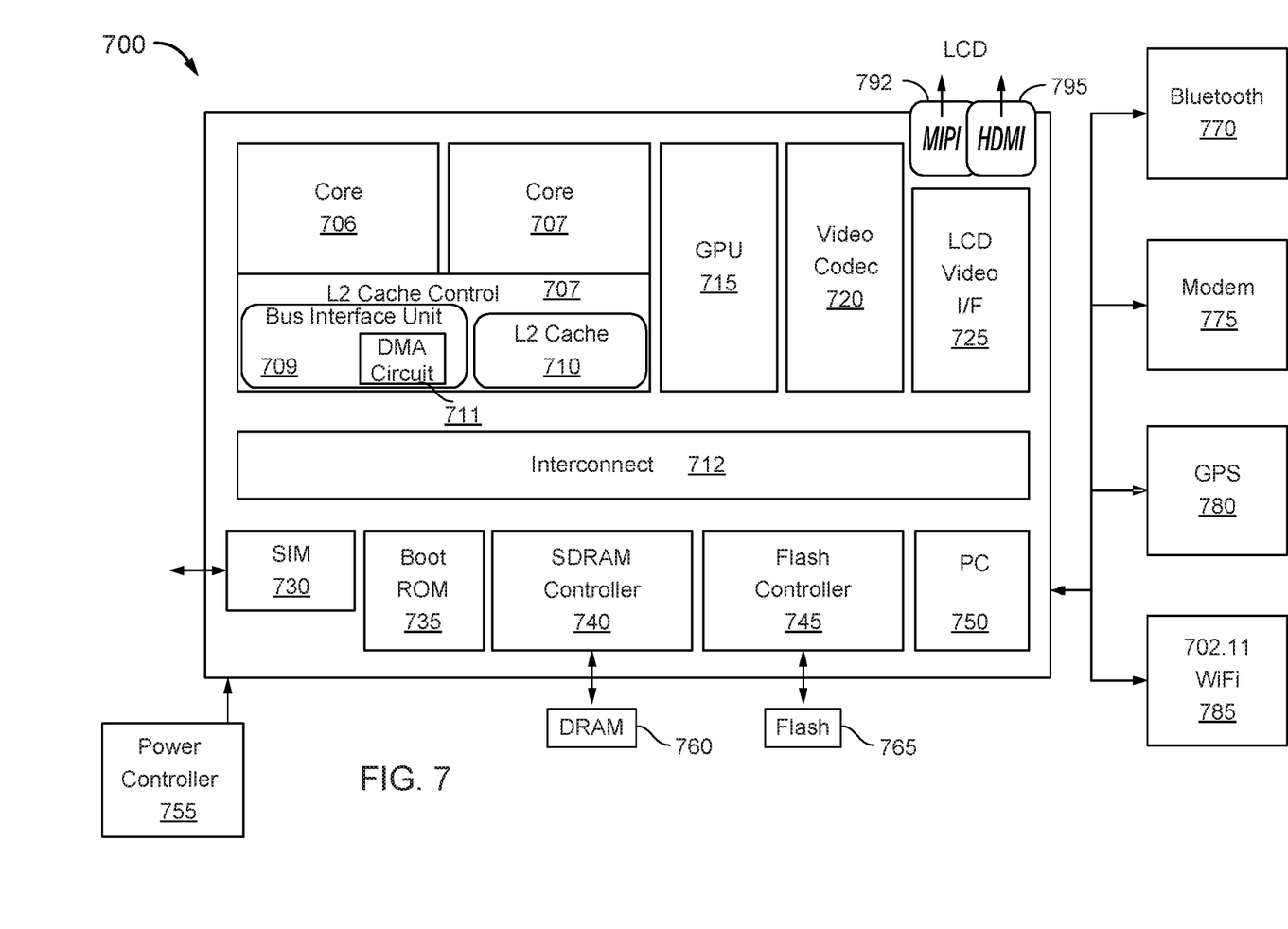
FIG. 7 is a block diagram of an embodiment of a SoC design in accordance with an embodiment.

Turning next to FIG. 7, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an Instruction Set Architecture, such as an Intel® Architecture Core™- based processor, an Advanced Micro Devices, Inc. (AMD) processor, a MIPS-based processor, an ARM-based processor design, or a customer thereof, as well as their licensees or adopters. Cores 706 and 707 are coupled to cache controller 708 that is associated with bus interface unit 709 and L2 cache 710 to communicate with other parts of system 700 via an interconnect 712. As seen, bus interface unit 709 includes a DMA circuit 711 configured to send RDMA write requests with a high priority indication, such that these requests may be guaranteed to complete once they reach a persistent domain of one or more intervening components on a path to a persistent memory, as described herein.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 860), a flash controller 745 to interface with non-volatile memory (e.g., flash 765), a peripheral controller 750 (e.g., an eSPI interface) to interface with peripherals, video codec 720 and video interface 725 to display and receive input (e.g., touch enabled input), GPU 715 to perform graphics related computations, etc. In addition, the system illustrates peripherals for communication, such as a Bluetooth module 770, 3G modem 775, GPS 780, and WiFi 785. Also included in the system is a power controller 755. Further illustrated in FIG. 7, system 700 may additionally include interfaces including a MIPI interface 792, e.g., to a display and/or an HDMI interface 795 also which may couple to the same or a different display.

Figure 8:
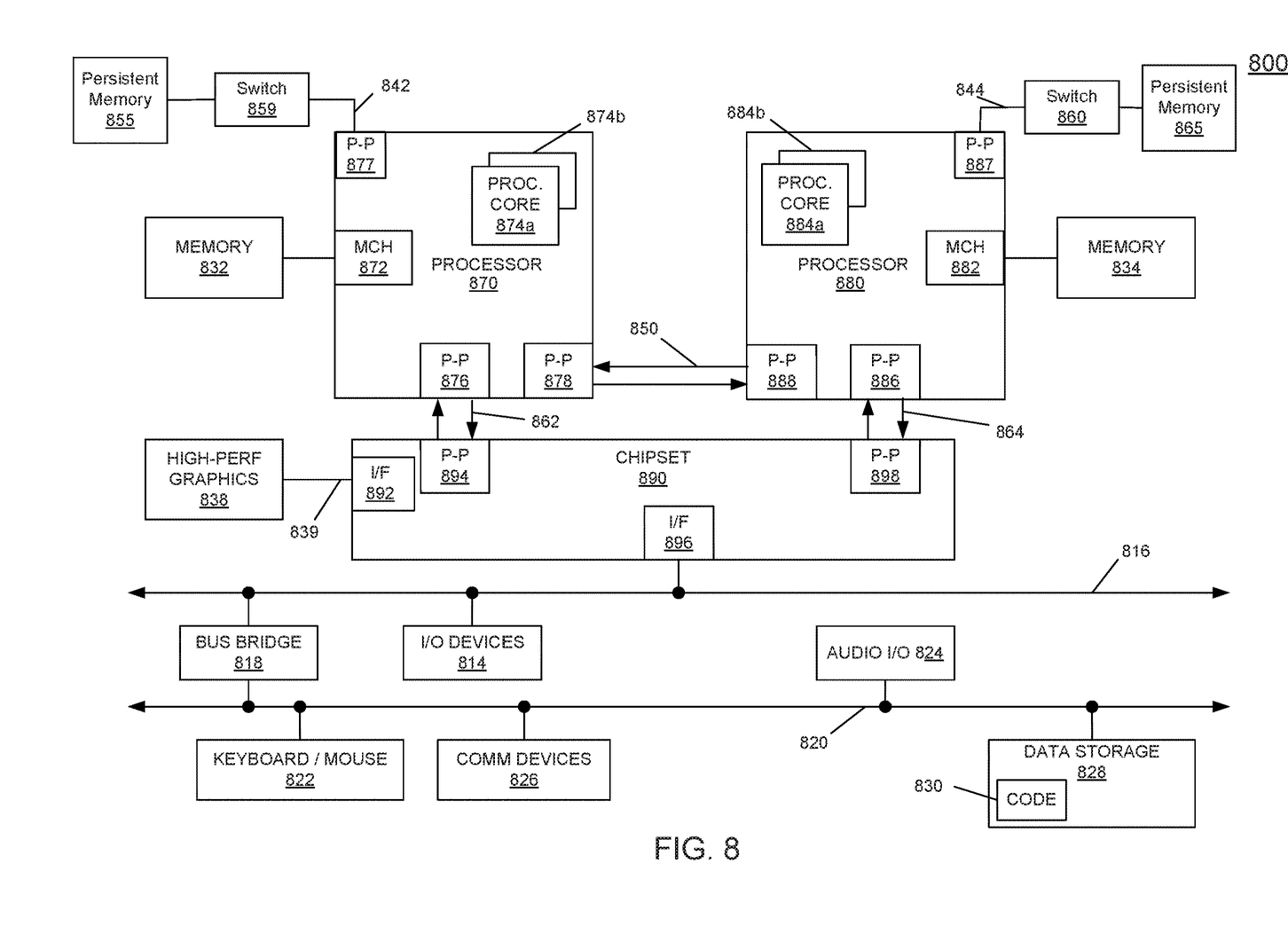
FIG. 8 is a block diagram of a system in accordance with another embodiment of the present invention.

Referring now to FIG. 8, shown is a block diagram of a system in accordance with another embodiment of the present invention. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874a and 874b and processor cores 884a and 884b).

In the embodiment of FIG. 8, processors 870 and 880 further include point-to point interconnects 877 and 887, which couple via interconnects 842 and 844 (which may be CXL buses) to switches 859 and 860, which may include persistent domains as described herein. In turn, switches 859, 860 couple to persistent memories 855 and 865. In this way, processors 870 and 880 may issue RDMA write requests with priority indications, such that these requests may complete even in the case of power failure in one or more of components, as described herein.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 876 and 886, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

The following examples pertain to further embodiments.

In one example, an apparatus includes: a first queue to store requests that are guaranteed to be delivered to a persistent memory; a second queue to store requests that are not guaranteed to be delivered to the persistent memory; a control circuit to receive the requests and to direct the requests to the first queue or the second queue based at least in part on priority of the requests; and an egress circuit coupled to the first queue to deliver the requests stored in the first queue to the persistent memory even when a power failure occurs.

In an example, the apparatus comprises a switch coupled between a network interface circuit and the persistent memory.

In an example, the switch is coupled to the network interface circuit via an interconnect, the interconnect having a plurality of virtual channels, where each of the plurality of virtual channels is associated with requests of a given priority level.

In an example, apparatus further comprises a battery, where the battery is to maintain sufficient charge to deliver the requests stored in the first queue to the persistent memory when the power failure occurs.

In an example, the control circuit comprises a scheduler coupled to the first queue, where the scheduler is to select a first request from the second queue and store the first request into the first queue.

In an example, responsive to the storage of the first request into the first queue, the apparatus is to send an acknowledgment to a requester of the first request to indicate that the first request is guaranteed to be stored in the persistent memory.

In an example, the apparatus is to send an acknowledgment to a requester of a second request when the control circuit directs the second request to the first queue.

In an example, the apparatus further comprises a plurality of first queues, each of the plurality of first queues associated with a traffic type.

In an example, the control circuit is to send an acknowledgment to a first requester of a first request when the control circuit directs the first request to the first queue, where the acknowledgment comprises a completion to notify the first requester that data of the first request was successfully stored in the persistent memory.

In an example, the egress circuit is to not deliver the requests stored in the second queue to the persistent memory when the power failure occurs.

In another example, a method comprises: receiving, in a switch coupled to a persistent memory, a first request from a first requester; in response to a first priority of the first request exceeding a threshold priority, storing the first request in a persistent queue of the switch; and sending an acknowledgment to the first requester responsive to storing the first request in the persistent queue, the acknowledgment comprising a guarantee that data of the first request is to be stored in the persistent memory even when a power failure occurs in the switch.

In an example, the method further comprises: receiving, in the switch, a second request from a second requester; and in response to a second priority of the second request not exceeding the threshold priority, storing the second request in a pending request queue of the switch.

In an example, the method further comprises, in response to determining that there is sufficient space in the persistent queue, selecting the second request from the second queue and storing the second request in the persistent queue.

In an example, the method further comprises: sending the second request from the persistent queue to the persistent memory; receiving an acknowledgment for the second request from the persistent memory; and in response to receiving the acknowledgment from the persistent memory, sending, from the switch, the acknowledgment to the second requester to indicate that data of the second request was stored into the persistent memory.

In an example, the method further comprises: determining whether the first request is for a permitted address space, and storing the first request in the persistent queue further in response to determining that the first request is for the permitted address space; and if the first request is not for the permitted address space, dropping the first request and sending an error message to the first requester.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor having at least one core, where the processor is to send a first write request and a second write request to a persistent memory, the first write request having a first priority and the second write request having a second priority, the first priority greater than the second priority; a switch coupled to the processor comprising: a first queue associated with the first priority, where the first queue is located in a persistent power domain such that requests stored in the first queue are guaranteed to be delivered to the persistent memory even upon a power failure; a second queue associated with the second priority, where the second queue is located in a non-persistent power domain such that requests stored in the second queue are not guaranteed to be delivered to the persistent memory upon the power failure; and a control circuit to receive the first write request and direct the first write request to the first queue, and receive the second write request and direct the second write request to the second queue. The persistent memory may be coupled to the switch.

In an example, responsive to storage of the first write request into the first queue, the switch is to send an acknowledgment to the processor to indicate that the first write request is guaranteed to be stored in the persistent memory.

In an example, the switch is to receive another acknowledgement from the persistent memory when data of the first write request is stored in the persistent memory, and the switch is to drop the another acknowledgement.

In an example, the switch is to receive a second acknowledgement from the persistent memory when data of the second write request is stored in the persistent memory and send the second acknowledgement to the processor to indicate that the second request has been stored in the persistent memory.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first queue to store requests that are guaranteed to be delivered to a persistent memory;
   a second queue to store requests that are not guaranteed to be delivered to the persistent memory;
   a control circuit to receive the requests and to direct the requests to the first queue or the second queue based at least in part on priority of the requests; and
   an egress circuit coupled to the first queue to deliver the requests stored in the first queue to the persistent memory even when a power failure occurs.

2. The apparatus of claim 1, wherein the apparatus comprises a switch coupled between a network interface circuit and the persistent memory.

3. The apparatus of claim 1, wherein the apparatus is coupled to a network interface circuit via an interconnect, the interconnect having a plurality of virtual channels, wherein each of the plurality of virtual channels is associated with requests of a given priority level.

4. The apparatus of claim 2, further comprising a battery, wherein the battery is to maintain sufficient charge to deliver the requests stored in the first queue to the persistent memory when the power failure occurs.

5. The apparatus of claim 1, wherein the control circuit comprises a scheduler coupled to the first queue, wherein the scheduler is to select a first request from the second queue and store the first request into the first queue.

6. The apparatus of claim 5, wherein responsive to the storage of the first request into the first queue, the apparatus is to send an acknowledgment to a requester of the first request to indicate that the first request is guaranteed to be stored in the persistent memory.

7. The apparatus of claim 6, wherein the apparatus is to send an acknowledgment to a requester of a second request when the control circuit directs the second request to the first queue.

8. The apparatus of claim 1, further comprising a plurality of first queues, each of the plurality of first queues associated with a traffic type.

9. The apparatus of claim 1, wherein the control circuit is to send an acknowledgment to a first requester of a first request when the control circuit directs the first request to the first queue, wherein the acknowledgment comprises a completion to notify the first requester that data of the first request was successfully stored in the persistent memory.

10. The apparatus of claim 9, wherein the control circuit is to not send an acknowledgment to a second requester of a second request when the control circuit directs the second request to the second queue.

11. The apparatus of claim 1, wherein the egress circuit is to not deliver the requests stored in the second queue to the persistent memory when the power failure occurs.

12. At least one non-transitory computer readable storage medium having stored thereon instructions, which if performed by a machine cause the machine to perform a method comprising:
   receiving, in a switch coupled to a persistent memory, a first request from a first requester;
   in response to a first priority of the first request exceeding a threshold priority and determining that the first request is for a permitted address space:
      storing the first request in a persistent queue of the switch; and
      if the first request is not for the permitted address space, dropping the first request and sending an error message to the first requester; and
   sending an acknowledgment to the first requester responsive to storing the first request in the persistent queue, the acknowledgment comprising a guarantee that data of the first request is to be stored in the persistent memory even when a power failure occurs in the switch.

13. The at least one non-transitory computer readable storage medium of claim 12, wherein the method further comprises:
   receiving, in the switch, a second request from a second requester; and
   in response to a second priority of the second request not exceeding the threshold priority, storing the second request in a pending request queue of the switch.

14. The at least one non-transitory computer readable storage medium of claim 13, wherein the method further comprises, in response to determining that there is sufficient space in the persistent queue, selecting the second request from the second queue and storing the second request in the persistent queue.

15. The at least one non-transitory computer readable storage medium of claim 14, wherein the method further comprises:
   sending the second request from the persistent queue to the persistent memory;
   receiving an acknowledgment for the second request from the persistent memory; and
   in response to receiving the acknowledgment from the persistent memory, sending, from the switch, the acknowledgment to the second requester to indicate that data of the second request was stored into the persistent memory.

16. A system comprising:
   a processor having at least one core, wherein the processor is to send a first write request and a second write request to a persistent memory, the first write request having a first priority and the second write request having a second priority, the first priority greater than the second priority;
   a switch coupled to the processor, the switch comprising:
      a first queue associated with the first priority, wherein the first queue is located in a persistent power domain to maintain sufficient charge upon a power failure such that requests stored in the first queue are guaranteed to be delivered to the persistent memory even upon the power failure;
      a second queue associated with the second priority, wherein the second queue is located in a non-persistent power domain such that requests stored in the second queue are not guaranteed to be delivered to the persistent memory upon the power failure; and
      a control circuit to receive the first write request and direct the first write request to the first queue, and receive the second write request and direct the second write request to the second queue; and
   the persistent memory coupled to the switch.

17. The system of claim 16, wherein responsive to storage of the first write request into the first queue, the switch is to send an acknowledgment to the processor to indicate that the first write request is guaranteed to be stored in the persistent memory.

18. The system of claim 17, wherein the switch is to receive another acknowledgement from the persistent memory when data of the first write request is stored in the persistent memory, and the switch is to drop the another acknowledgement.

19. The system of claim 17, wherein the switch is to receive a second acknowledgement from the persistent memory when data of the second write request is stored in the persistent memory and send the second acknowledgement to the processor to indicate that the second request has been stored in the persistent memory.

20. The system of claim 17, further comprising a plurality of first queues, each of the plurality of first queues associated with a traffic type.

* * * * *